Patented Dec. 2, 1924.

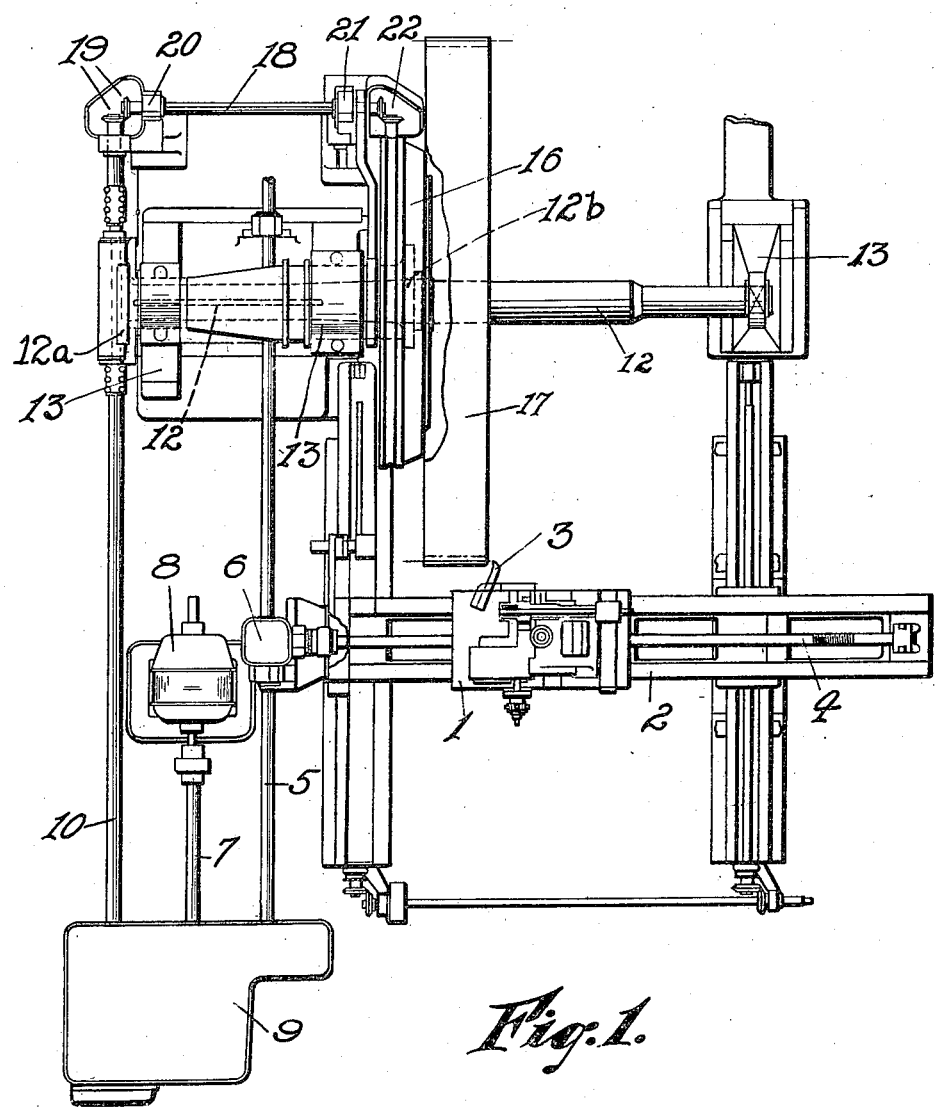
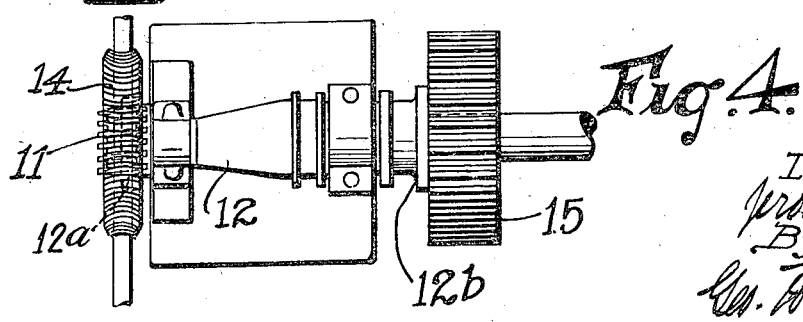

1,518,060

UNITED STATES PATENT OFFICE.

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

MACHINE FOR PLANING GEARS.

Application filed March 17, 1921. Serial No. 453,000.

*To all whom it may concern:*

Be it known that I, JEROME R. GEORGE, a citizen of the United States, residing at Worcester, in the county of Worcester and Commonwealth of Massachusetts, have invented a new and useful Improvement in a Machine for Planing Gears, of which the following, together with the accompanying drawings, is a specification.

My invention relates to machines for forming curved teeth on gear wheels by the use of reciprocating cutting and forming tools cooperating with simultaneously operated work rotating devices.

The object of my invention is to provide a machine of the above described type with an improved work rotating device, whereby the machine is rendered universal in its application to the extent that gear blanks having a wide range of weights and diameters may be cut thereby, without making any changes in the general arrangement of the machine. Other advantageous features of my invention will hereinafter more fully appear, reference being had to the accompanying drawings, in which—

Figure 1 is a plan view of a machine embodying my invention arranged for cutting gear blanks of large diameter.

Figure 2 in an enlarged front elevation of a portion of the machine of Fig. 1.

Figure 4 is a plan view of a portion of the machine showing the arrangement for cutting gear blanks of small diameter.

Like reference characters refer to like parts in the different figures.

Figure 2:
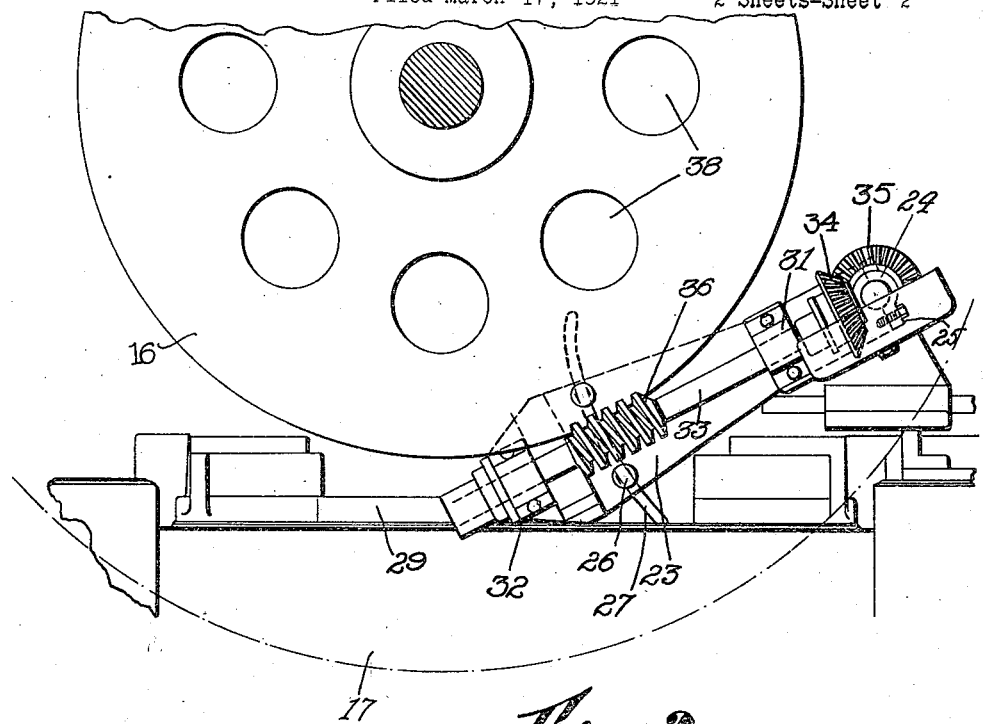

Referring to Fig. 1, my improved mechanism is shown, for purposes of illustration, in connection with a gear cutting machine which is fully shown and described in the copending patent application of Elbert H. Carroll, Serial No. 457,398 filed March 31, 1921. The above described machine generally comprises a tool slide 1, adapted to travel on ways 2 and provided with a cutting or planing tool 3. The slide 1 is adapted to be moved back and forth on the ways 2 by means of a screw shaft 4 which is driven from a shaft 5 through suitable gearing, as indicated at 6. The shaft 5 is connected to a drive shaft 7 coupled to an electric motor 8 through suitable gearing inclosed within a casing 9.

The drive shaft 7 is also connected by gearing within the casing 9 to a second shaft 10 which extends substantially at right angles to the line of movement of the tool slide 1. The shaft 10 is provided with a worm 11, shown in dotted lines, which is located within a suitable housing. A mandrel 12 is rotatably supported in bearings 13, 13, with its axis of rotation parallel to the line of movement of the slide 1. The mandrel 12 is provided with seats or flanges $12^a$ and $12^b$ for receiving suitable driving members, by means of which the mandrel 12 may be driven from the shaft 10. The disposition of the driving members on the mandrel 12 is determined by the size of the gear blank which it may be desired to cut on the machine, as will hereinafter appear.

Referring now to Fig. 4, when it is desired to cut a gear blank of relatively small diameter, a worm gear wheel 14 is attached to the flange $12^a$ in mesh with the worm 11 on shaft 10. The gear blank 15 then rotates with the mandrel 12 and teeth may be cut on the outer periphery of the blank 15 by the reciprocating tool 3, in the usual manner. With the above described arrangement, it is possible to cut gear blanks of very small diameters, as there is ample clearance for the tool 3 on either side of the blanks 15. I have found, however, that difficulties are encountered when it is desired to cut heavy gear blanks of relatively large diameter with the arrangement of Fig. 4. These difficulties are due, in part, to the fact that the mandrel 12 is subjected to severe torsional strains in overcoming the inertia of a heavy blank when starting, or changing the direction of rotation of the same, so that the chattering of the blank results. Furthermore, the fact that the size of the gear wheel 14 is fixed by the distance between the axes of the shaft 10 and the mandrel 12 also imposes further limitations upon the size of the blanks that can be indexed accurately. Obviously, accuracy in indexing is decreased when the point of cutting on the blank is at an appreciably greater radial distance from the axis of the mandrel than the point of application of the rotative force to the mandrel, and it is impracticable to increase the diameter of the gear wheel 14.

In order to overcome the above described difficulties in cutting gear blanks and thereby render the machine universal in its application, I propose to provide means for rotating large gear blanks by direct attachment to a driving member rather than through the mandrel. To this end a gear wheel, or blank carrier 16 is secured to the flange 12$^b$ on the mandrel 12 and a gear blank 17 is mounted thereon, as shown in Fig. 1. The shaft 10 is extended beyond the worm 11 and is connected by gearing 19 to a cross shaft 18, which is mounted in bearings 20 and 21. The shaft 18 extends beyond the bearing 21 and is connected by gearing 22 to means for applying a rotative force to the outer periphery of the blank carrier 16.

Figure 3:
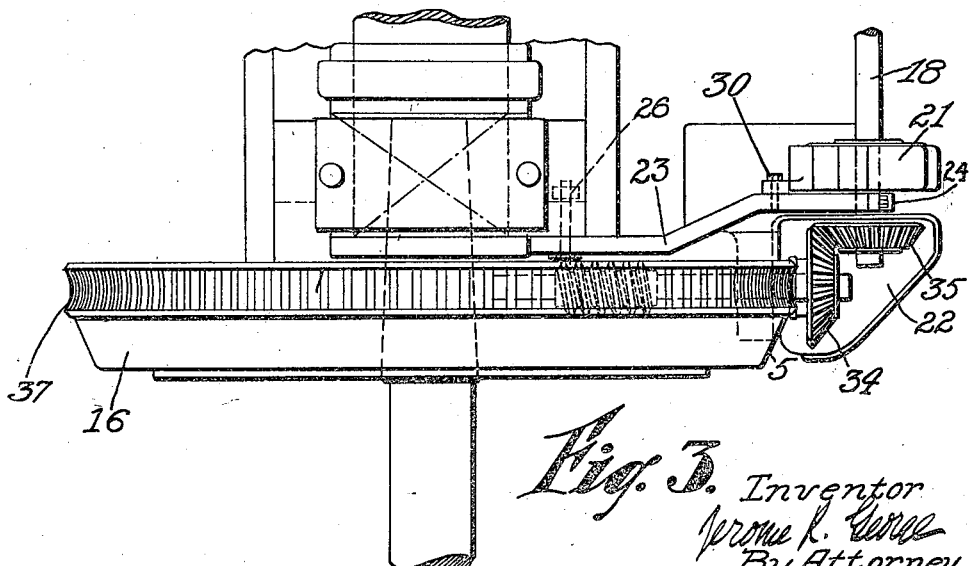
Figure 3 is a plan view of the parts shown in Fig. 2.

Referring now to Figs. 2 and 3, a bracket 23 is pivotally connected at one end to that portion of the shaft 18 extending beyond the bearing 21, by means of a cap 24 and bolts 25. The bracket 23 is thus adapted to swing about the axis of rotation of the shaft 18, and may be secured in position with any desired angular relation thereto by means of bolts 26 which are received in a curved slot 27 provided in an upwardly extending portion of the bed plate 29 of the machine. The bracket 23 is also secured to the bearing 21 by means of a bolt 30. The bracket 23 is provided with bearings 31 and 32, between which is mounted a shaft 33 that is connected to the cross shaft 18 by bevel gears 34 and 35. A worm 36 is mounted on the shaft 33 and is in mesh with gear teeth 37 formed on the outer periphery of the blank carrier 16. The carrier 16 is provided with a series of openings 38 by means of which the gear blank 17 may be secured thereto, for operation upon by the tool 3, as shown in Fig. 1.

From the foregoing, it is apparent that the above described arrangement is particularly advantageous when it is desired to cut gear blanks of large diameter and weight, because of the direct application of the force for rotating the blank at a point near the periphery of the blank. If, as previously pointed out, the mandrel 12, with the heavy blank 17 mounted thereon, should be driven directly from the shaft 10, the mandrel would be subjected to severe torsional strains in overcoming the inertia of the blank when starting or changing the direction of rotation of the same. By applying the rotative force at a point close to the periphery of the gear blank, however, torsional strains in the mandrel are prevented.

The mounting of the worm 36 on the swinging brackets 23 also permits the rotative force to be applied to a blank carrier at different radial distances from the axis of rotation of the mandrel 12, so that there is practically no limitation to the size of the blank carrier that may be employed. This ability to vary the point of application of the rotative force to the blank also tends to increase the accuracy of the machine in cutting. It is obvious that the indexing of the work, preparatory to cutting, can be carried on with much greater accuracy at a point near the periphery of the blank than at a point near the axis of rotation of the blank. Consequently, the possibility of applying the rotative force at different radial distances from the axis of rotation of the blank insures that gear blanks of large diameter may be cut with the same accuracy as blanks of less diameter.

While I have shown my invention as applied to a particular type of gear cutting machine, it is obvious that it may as well be applied to other types of gear cutting machines employing a rotatable mandrel for supporting the gear blank. Briefly stated, my invention resides in the provision of means for applying a rotative force to a blank, either through the mandrel, or by direct attachment of the blank to a carrier to which the force may be applied at different radial distances from its axis of rotation. In this way the machine is rendered substantially universal in its application to the cutting of gear blanks of different diameters. In order to cut a blank of large diameter, after cutting a blank of small diameter, it is only necessary to remove the gear wheel 14 from the mandrel 12 and to substitute therefor a blank carrier 16 of the proper diameter for the blank which it is desired to cut. Obviously the principle involved may be applied to different machines in different ways without departing from the spirit and scope of my invention, and I desire therefore that only such limitations be imposed thereon as come within the scope of the appended claims.

I claim,—

1. In a machine of the class described, the combination with a rotatable blank carrier and a rotating actuating member having a fixed axis parallel to the axis of said carrier, of a shaft connected to said member and adapted to be swung about the axis of said member for applying a rotative force to the periphery of said carrier.

2. In a machine of the class described, the combination with a rotatable blank carrier and a rotating actuating member having a fixed axis parallel to the axis of said carrier, of a shaft connected to said member and mounted on a bracket adapted to be swung about the axis of said member, the said shaft carrying a worm in mesh with teeth provided on the periphery of said carrier.

3. In a machine of the class described, the combination with a rotating actuating member, a rotatable mandrel and a blank, of means for applying the rotative force of said member to said blank, either through the mandrel, or by direct attachment of said blank to a carrier operatively connected to said actuating member.

4. In a machine of the class described, the combination with a rotating actuating member, a rotatable mandrel and a blank carrier, of means for applying the rotative force of said actuating member to said mandrel and to said blank carrier, respectively, at different places along the axis of rotation of said mandrel.

5. In a machine of the class described, the combination with a rotating actuating member, a rotatable mandrel and a blank carrier, of means for applying the rotative force of said actuating member to said mandrel and to said blank carrier, respectively, at different places along the axis of rotation of said mandrel and at different radial distances therefrom.

6. In a machine of the class described, the combination with a rotating actuating member having a fixed axis of rotation, a rotatable mandrel and a blank carrier, of means for applying the rotative force of said member to said mandrel at a point between their respective axes of rotation and further means for applying the rotative force of said member to said carrier at a point a greater radial distance from the axis of said mandrel than the axis of said actuating member.

7. In a machine of the class described, the combination with a rotatable blank carrier and a rotating actuating member having a fixed axis of rotation parallel to the axis of said carrier, of means for applying the rotative force of said actuating member to the blank carrier at different radial distances from the axis of rotation of said carrier and at a constant radial distance from the axis of said member.

8. In a machine of the class described, the combination with a rotatable blank carrier and a rotating actuating member having a fixed axis of rotation, of a bracket adapted to be swung about the axis of said member, said bracket carrying a shaft geared at one end to said actuating member and provided at its other end with a worm in engagement with teeth provided on the periphery of said carrier.

9. In a machine of the class described, the combination with a rotatable blank carrier and a rotating actuating member having a fixed axis of rotation, of a bracket adapted to be swung about the axis of said member, said bracket carrying a shaft geared to said actuating member and provided with a worm for driving said carrier, and means for securing said bracket in different positions about its pivotal axis to position said worm at different radial distances from the axis of said carrier.

Dated this eleventh day of March, 1921.

JEROME R. GEORGE.

Witnesses:
GEO. H. KENNEDY, Jr.,
PENELOPE COMBERBACH.